(12) United States Patent
Baldovino et al.

(10) Patent No.: US 10,597,002 B1
(45) Date of Patent: Mar. 24, 2020

(54) IMAGING SYSTEM

(71) Applicant: Ford Global Technologies, LLC, Dearborn, MI (US)

(72) Inventors: Segundo Baldovino, Novi, MI (US); Prashant Dubey, Canton, MI (US); Venkatesh Krishnan, Canton, MI (US); Laron Michelle Brown, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/138,112

(22) Filed: Sep. 21, 2018

(51) Int. Cl.
*H02P 1/04* (2006.01)
*B60S 1/08* (2006.01)
*G06K 9/46* (2006.01)
*B60H 1/00* (2006.01)

(52) U.S. Cl.
CPC ........ *B60S 1/0833* (2013.01); *B60H 1/00735* (2013.01); *G06K 9/4661* (2013.01)

(58) Field of Classification Search
CPC ................................ H02H 3/085; H01L 23/34
See application file for complete search history.

(56) References Cited

U.S. PATENT DOCUMENTS

| | | |
|---|---|---|
| 3,697,863 A | 10/1972 | Kilner |
| 4,159,874 A | 7/1979 | Dearth et al. |
| 5,508,595 A | 4/1996 | Schaefer |
| 5,610,756 A | 3/1997 | Lynam et al. |
| 9,734,425 B2 | 8/2017 | Zhong et al. |
| 2003/0233172 A1 | 12/2003 | Granqvist et al. |
| 2012/0170119 A1 | 7/2012 | Chu et al. |
| 2012/0218674 A1* | 8/2012 | Schultz .................. H02H 3/085 361/93.8 |
| 2013/0200984 A1* | 8/2013 | Matthiesen .......... H01H 37/761 337/186 |
| 2013/0340409 A1* | 12/2013 | Hodgson ................. F01N 3/208 60/274 |
| 2016/0297406 A1 | 10/2016 | Jansen et al. |
| 2017/0257910 A1 | 9/2017 | Oldenzijl et al. |
| 2018/0095057 A1 | 4/2018 | McQuillen et al. |

(Continued)

FOREIGN PATENT DOCUMENTS

| | | |
|---|---|---|
| CN | 202413712 U | 9/2012 |
| CN | 105657884 A | 6/2016 |
| CN | 106427902 A | 2/2017 |

(Continued)

OTHER PUBLICATIONS

The Electronics Group of Henkel, "Henkel PTC Inks Lend New Efficiency, Functionality to Heating Applications", Press Release dated Oct. 17, 2014 (2 pages).

(Continued)

*Primary Examiner* — Karen Masih
(74) *Attorney, Agent, or Firm* — Frank MacKenzie; Bejin Bieneman PLC

(57) ABSTRACT

A sensor and a system using the sensor are described. The sensor may comprise: a cover; and a positive temperature coefficient (PTC) shroud located at a periphery of the cover. The system may include one or more such sensors in a passage of a housing. The system further may comprise a blower that moves air through the passage and across at least a portion of the sensor(s).

19 Claims, 7 Drawing Sheets

(56) References Cited

U.S. PATENT DOCUMENTS

2019/0039438 A1\* 2/2019 Wakisaka ............ B60H 1/3205

FOREIGN PATENT DOCUMENTS

| CN | 107091548 A | 8/2017 |
| DE | 10346270 A1 | 7/2004 |
| EP | 1943130 B1 | 5/2010 |
| WO | 2017151348 A1 | 9/2017 |

OTHER PUBLICATIONS

Non-Final Office Action dated Aug. 1, 2019 for U.S. Appl. No. 16/138,097 (15 pages).

\* cited by examiner

IMAGING SYSTEM

BACKGROUND

When a sensor is exposed to an outdoor environment, extreme temperatures and the like can affect sensor performance. For example, under some conditions, ice can build up on a cover of the sensor and thereby block light from entering the sensor and/or obscure imaging.

DETAILED DESCRIPTION

Figure 1:
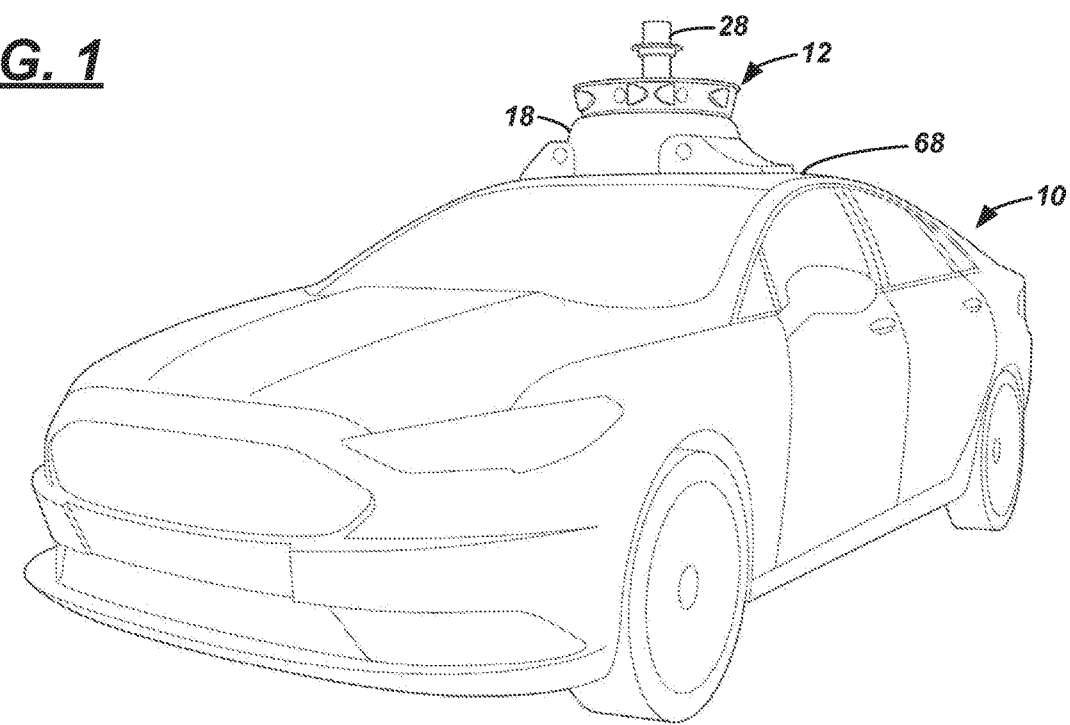
FIG. 1 is a perspective view of a vehicle comprising an imaging system that comprises a housing carrying a sensor suite.
Figure 2:
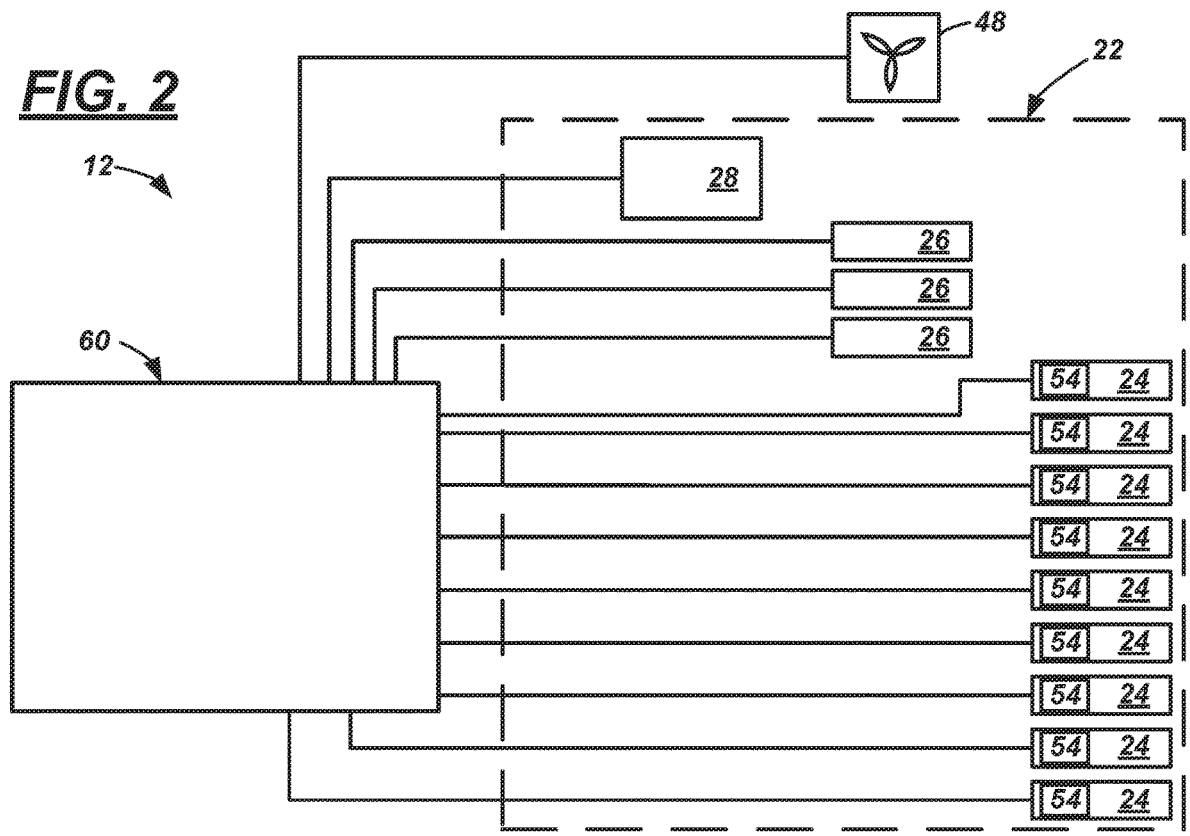
FIG. 2 is a schematic diagram of the imaging system illustrating the sensor suite and a computer of the imaging system.

An imaging system is described in detail below that includes at least one sensor. According to one illustrative example, the sensor comprises: a cover; and a positive temperature coefficient (PTC) shroud located at a periphery of the cover.

According to the at least one example set forth above, the cover is a transparent window, a transparent optic, or a transparent film.

According to the at least one example set forth above, the cover is located in front of a lens of the sensor.

According to the at least one example set forth above, the shroud comprises a plurality of daisy-chained PTC elements.

According to the at least one example set forth above, the shroud comprises a plurality of PTC elements coupled in parallel.

According to the at least one example set forth above, the sensor further comprises an active cooler electrically coupled to the PTC shroud.

According to the at least one example set forth above, the cooler is a thermoelectric cooler.

According to the at least one example set forth above, the cooler and PTC shroud are electrically coupled so that when the cooler is actuated to an ON state, current is provided to the PTC shroud.

According to at least one illustrative example, a system is disclosed that comprises: a housing that carries the sensor [described above] in a passage thereof; and a blower, wherein, when the blower is in an ON state, the cooler is actuated to the ON state and air heated by the sensor is moved out of the housing.

According to at least one illustrative example, a system is disclosed that comprises: a housing that carries the sensor [described above] in a passage thereof; and a blower, wherein, when the blower is in an ON state, air heated by the sensor is moved out of the housing.

According to the at least one example set forth above, the housing is mounted to a roof of a vehicle.

According to the at least one example set forth above, the sensor further comprises a heat exchanger, wherein the housing comprises an inlet, an outlet, and at least one passage in fluid communication with one another, wherein the heat exchanger is located in the at least one passage.

According to the at least one example set forth above, the system further comprises a first computer that controls: the blower between an OFF state and the ON state, and whether current flows through the PTC shroud; and a second computer that receives image data, range data, or both from the sensor.

According to the at least one example set forth above, the first and second computers are a single computing device.

According to the at least one example set forth above, based on a degradation of image data received from the sensor, the second computer instructs the first computer to actuate the blower to the ON state.

According to the at least one example set forth above, the passage is an annular passage, and further comprising a plurality of sensors as described in claim 1, wherein the plurality is circumferentially-spaced from one another in the annular passage, each sensor positioned radially outwardly.

According to another illustrative example, a system is disclosed that comprises: a housing, comprising an interior passage; and a plurality of sensors in the passage, each sensor, comprising: a cover; and a positive temperature coefficient (PTC) shroud located at a periphery of the cover.

According to the at least one example set forth above, each sensor further comprises: an active cooler electrically coupled to the PTC shroud so that when the cooler is actuated to an ON state, current is provided to the PTC shroud.

According to the at least one example set forth above, the system further comprises a blower moves air through the passage and that is electrically coupled to the cooler so that, when the blower is actuated to an ON state, the cooler also is actuated to the ON state.

According to the at least one example set forth above, the system further comprises a blower that moves air through the passage, wherein the housing comprises an outlet located proximate to each respective cover so that when the blower moves air, it is expelled from the housing via the outlets.

According to the at least one example, a method is disclosed that includes control of any of the system elements set forth above.

Turning now to the figures wherein like reference numerals denote like or similar elements, features or functions, a vehicle 10 is shown that comprises an imaging system 12. The imaging system 12 may comprise a housing 18 having a fluid distribution system 20 and a sensor suite 22 (system 20 and sensor suite 22 shown in FIGS. 2-4 and 7). Sensor suite 22 comprises one or more sensors carried by the housing 18, the sensors arranged to provide the vehicle 10 situational awareness (e.g., for operation in an autonomous mode or the like). For example, the suite 22 may include one or more camera sensors 24 (e.g., hereafter, referred to simply as cameras), one or more radio detection and ranging (radar) sensors 26, one or more light detection and ranging (lidar) sensors 28, and the like). As will be described more below, in at least one example, the distribution system 20 within the housing 18 may include at least one inlet 30 (e.g., two are shown), one or more interior passages 34, 36, 38 in fluid communication with one another, a blower 48 for moving air within the passages 34-38, and at least one outlet 50 (e.g., one for each sensor). In one example, each of the sensors may radiate heat within at least one of the passages 34-38 (heating the air therein), air may be received into the housing 18 via the inlet(s), and the blower 48 may move the heated air through the passages 34-38 and out of the housing 18 via the outlet(s) 50. In at least one example, each sensor comprises a cover 52 and the housing 18 comprises an outlet 50 proximate to each respective cover 52. Accordingly, forced air may be directed out of the housing 18 via the outlet(s) 50 and onto respective covers 52 to remove debris therefrom (as used herein, debris includes dust, dirt, ice, snow, moisture, fog, rain droplets, and the like). In this manner, the covers 52 may be cleaned and concurrently, the fluid distribution system 20 may cool the sensors of suite 22 (e.g., if necessary).

Figure 11:
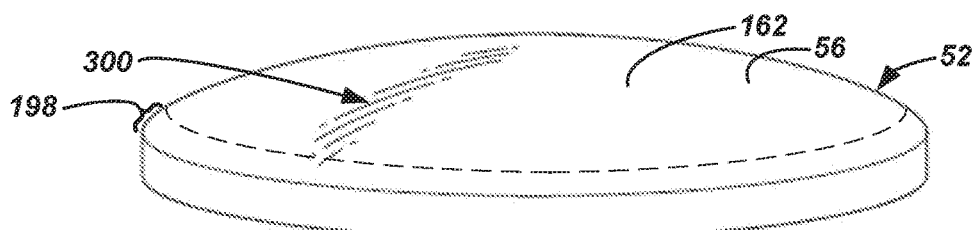
FIG. 11 is an enlarged top view of a portion of the PTC shroud shown in FIG. 10.
Figure 11:
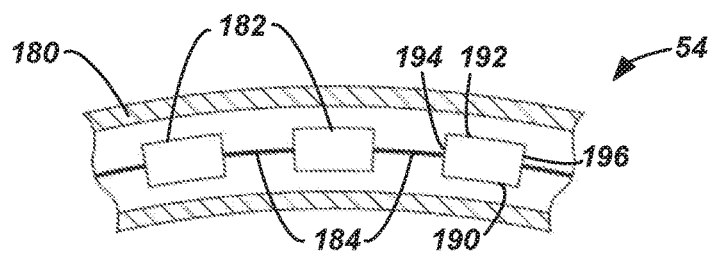

According to one example explained more below, at least some of the covers 52 comprise a positive temperature coefficient (PTC) shroud 54 (FIG. 11) located on an outer surface 56 thereof. As used herein, a positive temperature coefficient (PTC) shroud is a shroud comprised of electrically-resistive material adapted to radiate heat, wherein the resistance thereof is directly proportional to temperature, wherein, when the shroud is coupled electrically to a power source and the temperature is less than a predetermined threshold, resistance decreases and heat radiation increases, and wherein, when the shroud is coupled electrically to a power source and the temperature is greater than a predetermined threshold, resistance increases and heat radiation decreases. It should be appreciated that directly proportional to temperature may or may not be linearly proportional; typically, the relationship is not linear. In at least one example, a narrow temperature band (e.g., 10-15) comprises a transition region of the PTC shroud—e.g., wherein, in this region, resistance typically increases six to eight times over this temperature range. As used herein, a shroud is an apparatus that is coupled to a cover, window, optic, lens, or other like component of an electronic sensor so that, when actuated electrically, it may heat the respective sensor component.

As explained more below, each PTC shroud 54 may be coupled electrically to an active cooler 58 of the respective sensor (FIG. 8); e.g., wherein the cooler 58 serves to move heat away from the sensor. According to one example shown in FIGS. 2-6, each of the illustrated cameras 24 comprise a shroud 54 on the respective outer surfaces 56 of the covers 52. As described more below, for at least some of the sensors of system 12, a first computer 60 of the imaging system 12 may control a thermal circuit 62 (that includes the blower 48, the respective active coolers 58, and the corresponding PTC shrouds 54). According to one electrical arrangement, when the blower 48 is actuated to an ON state, each respective active cooler 58 is actuated to an ON state and current is passed through the corresponding PTC shroud 54. Thus, when the temperature at the PTC shroud(s) 54 are less than a predetermined threshold, the shroud(s) 54 warm the cover(s) 52, and warm forced air is expelled across the cover 52. This illustrative operation may be suitable for removing ice or melting snow from the cover 52 and thereby improving imaging capability of the sensor. Alternatively, when the temperature at the PTC shroud(s) 54 is greater than or equal to the predetermined threshold, forced air still may be expelled across the cover 52, however, resistivity of the shroud(s) 54 increase thereby minimizing the amount of heat radiated therefrom. This illustrative operation may be more suitable for removing dust and dirt from the cover 52 (e.g., again to improve imaging capability) than for melting ice and snow, as the threshold temperature may be too high for ice/snow. As discussed more below, use of the PTC shroud(s) 54 can minimize the need for direct electrical control of a heating element for the cover, window, optic, lens, or other like sensor component, as the PTC shroud(s) 54 may be self-regulating with respect to temperature control. And in one example, coupling the PTC shroud(s) 54 with other electrical components (e.g., the blower 48 and active coolers 58) may improve cleaning of the imaging system 12.

FIG. 1 illustrates vehicle 10 as a passenger vehicle; however, vehicle 10 could be any other suitable vehicle type, including a truck, a sports utility vehicle (SUV), a recreational vehicle, a bus, aircraft, marine vessel, or the like that comprises the imaging system 12. In at least one example, the imaging system 12 is adapted to facilitate operation of vehicle 10 in one or more autonomous modes, as defined by the Society of Automotive Engineers (SAE) (which has defined operation at levels 0-5). For example, imaging system 12 may provide two- and/or three-dimensional data of its surroundings to a second computer 64 (discussed more below) which may be programmed and/or configured to store and execute logic instructions embodied in hardware, software, firmware, a combination thereof, or the like, and which enables vehicle 10 to operate with some user assistance (partial autonomy) or without any user assistance (full autonomy). For example, at levels 0-2, a human driver monitors or controls the majority of the driving tasks, often with no help from the vehicle 10. For example, at level 0 ("no automation"), a human driver is responsible for all vehicle operations. At level 1 ("driver assistance"), vehicle 10 sometimes assists with steering, acceleration, or braking, but the driver is still responsible for the vast majority of the vehicle control. At level 2 ("partial automation"), vehicle 10 can control steering, acceleration, and braking under certain circumstances without human interaction. At levels 3-5, vehicle 10 assumes more driving-related tasks. At level 3 ("conditional automation"), vehicle 10 can handle steering, acceleration, and braking under certain circumstances, as well as monitoring of the driving environment. Level 3 may require the driver to intervene occasionally, however. At level 4 ("high automation"), vehicle 10 can handle the same tasks as at level 3 but without relying on the driver to intervene in certain driving modes. At level 5 ("full automation"), vehicle 10 can handle all tasks without any driver intervention.

Housing 18 may be carried by vehicle 10 on a roof 68 thereof or at any other suitable location. The illustrated housing 18 may comprise any suitable structure to support the sensor suite 22 and blower 48. In general, it may have a shell 70 which comprises a base 72 and a tower 74. In at least one example, the base 72 comprises two inlets 30 (to one or more first passages 34) which face vehicle-forwardly (FIG. 3), and the base couples the housing 18 to the vehicle 10. In this manner, when the vehicle 10 is being operated in DRIVE (forwardly), the inlets 30 may receive air into the first passage(s) 34; e.g., also into the base 72 (see FIG. 4).

The tower 74 may extend upwardly from the base 72 and may be generally cylindrical in shape; however, this is not required. A lower portion 76 of the tower 74 may enclose the blower 48 and at least one second passage 36 within which the blower 48 may be mounted. Passage(s) 34 and 36 may be in fluid communication with one another (e.g., via an opening 77).

Figure 3:
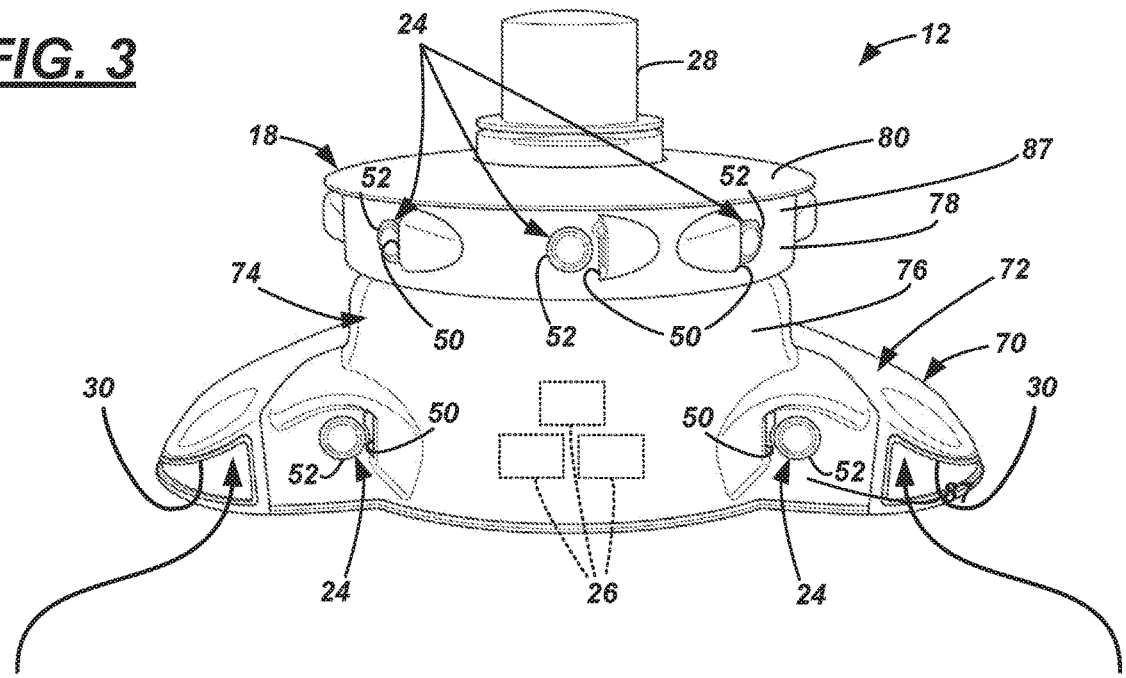
FIG. 3 is a perspective front view of the housing of the imaging system.

In one example, lower portion 76 may carry the radar sensors 26 (e.g., facing vehicle-forwardly as shown in FIG. 3, or in any other suitable arrangement). Radar sensors 26 may be in at least partial fluid communication with second passage(s) 36; so that excess heat radiated from sensors 26 may be moved out of the housing 18.

Figure 4:
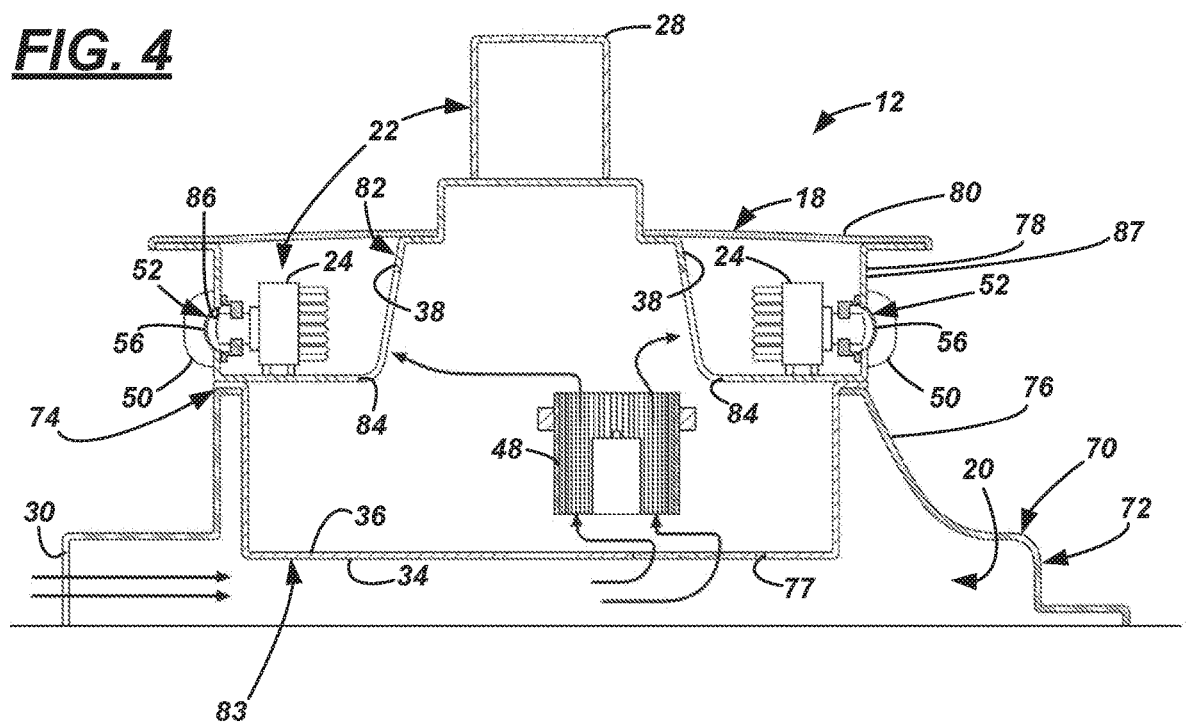
FIG. 4 is a sectional side view of the housing.

An annular portion 78 may be coupled to and may extend upwardly from the lower portion 76, may comprise at least one third passage 38, may be adapted to carry an array of cameras 24 within the at least one third passage 38, and may be adapted to carry the lidar sensor 28 on a lid 80 of the annular portion 78. As best shown in FIG. 4, second passage 36 may comprise a knurled portion 82 extending upwardly from a basin portion 83 of the same—e.g., and the knurled portion 82 may comprise an arrangement of circumferentially-spaced openings 84 (see FIG. 5). Third passage 38 may extend annularly around the knurled portion 82 and may be in fluid communication with second passage 36—at least via the openings 84. In at least one example, the circumferential location of each opening 84 may correspond with a mounting position of a camera 24. For example, the circumferentially-spaced cameras 24 (each facing radially outwardly) may be mounted to exterior openings 86 on a circumferential wall 87 of the annular portion 78 and may be positioned at least partially within the third passage 38 (e.g., to protect the cameras from the environment).

The knurled portion 82 may have an opening 88—at an upper edge 90—to second passage 36. Edge 90 may correspond with a shape and size of a base of lidar sensor 28—e.g., wherein the base of the lidar sensor 28 comprises a passive or active heat exchanger. In this manner, any excess heat radiated by lidar sensor 28 into second passage 36 via opening 88 may be expelled from the housing 18 (e.g., via blower 48).

Figure 5:
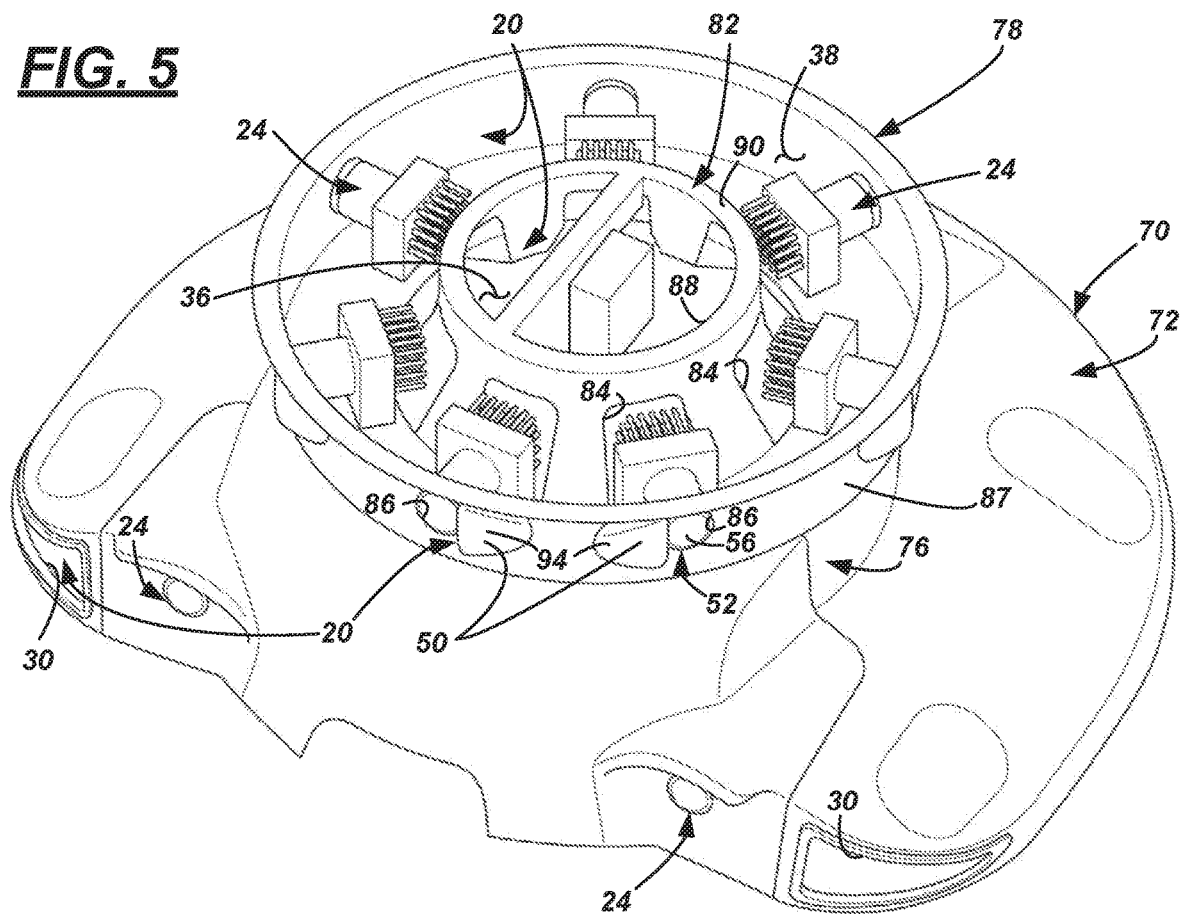
FIG. 5 is a perspective cut-away view of the housing, revealing an annular passage comprising a plurality of camera sensors of the sensor suite.
Figure 6:
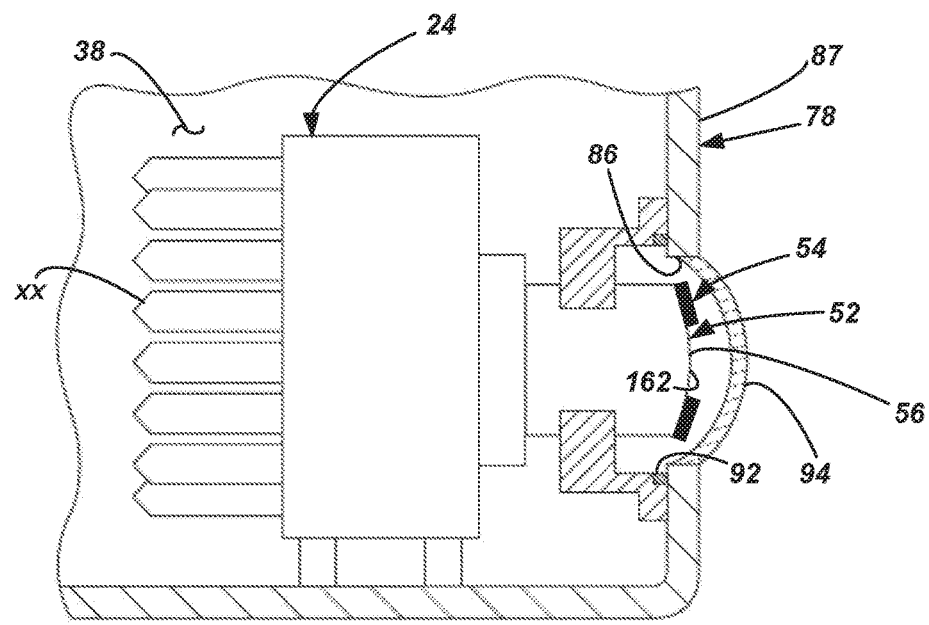
FIG. 6 is a sectional side view of a camera sensor within the housing.
Figure 7:
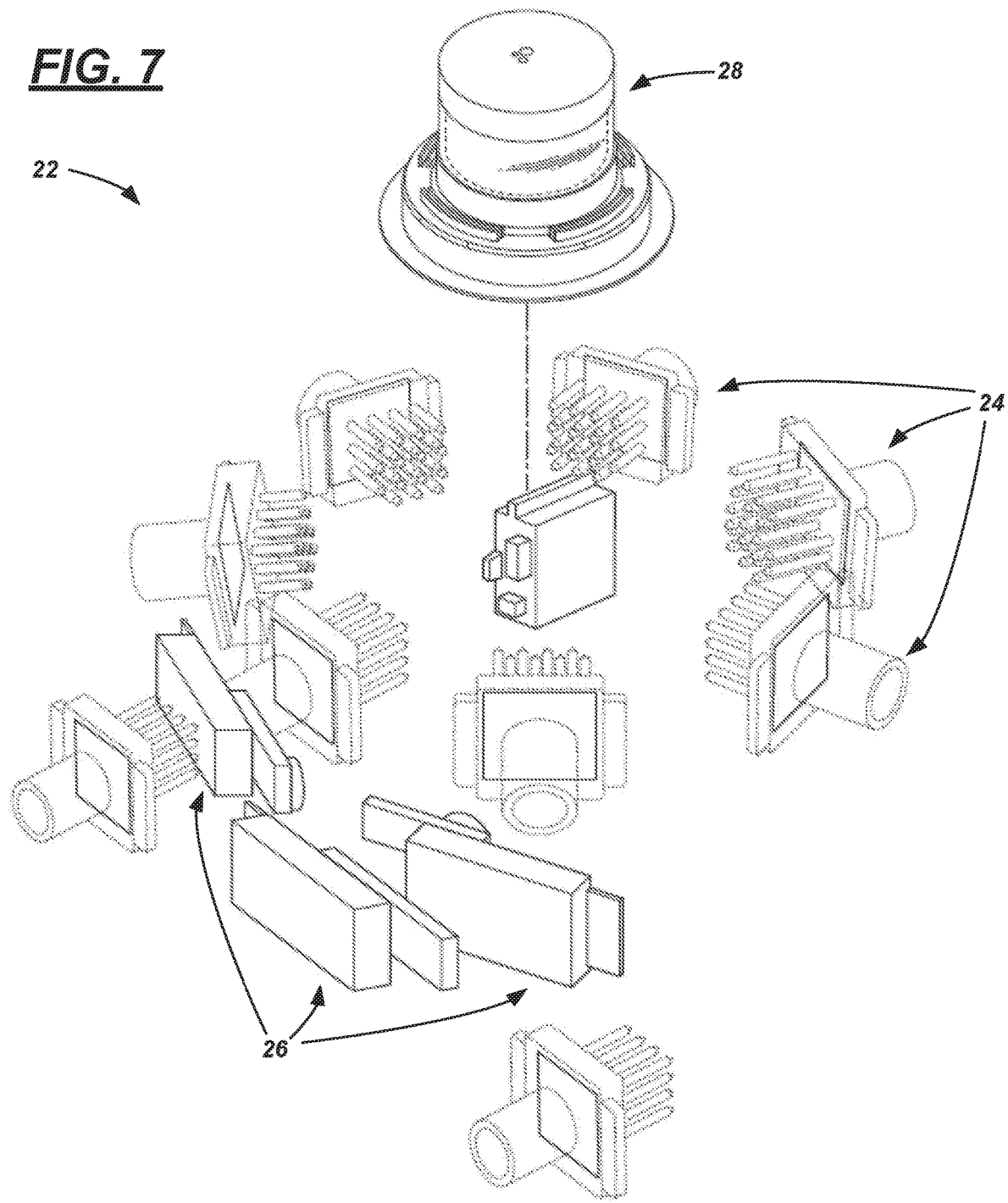
FIG. 7 is a perspective view of the imaging system, wherein exemplary elements other than the sensor suite are hidden.

The annular portion 78 may comprise a plurality of outlets 50 in wall 87, as best shown in FIGS. 3-5. Each outlet 50 may be identical; therefore, only one will be described. According to at least one example (see FIG. 6), each outlet 50 may comprise a hole 92 that extends through wall 87 and which is proximate to an exterior opening 86 (and accordingly proximate to a camera 24). Each outlet 50 also may comprise a hood 94 (FIGS. 5-6) to direct forced air which exits the hole 92 transversely with respect to the exterior opening 86 (e.g., and thus transversely with respect to the outer surface 56 of the cover 52 of the respective camera 24).

Other outlets may exist on housing 18 as well. For example, a circumferential outlet (not shown) may be positioned to exhaust air upwardly around lidar sensor 28, one more outlets can be positioned relative to radar sensors 26, or the like.

Housing 18 may carry sensors other than those discussed above (e.g., other than cameras 24, radar sensors 26, and lidar sensor(s) 28). Further, in one example, the sensors may be located in other regions of housing 18. For example, as shown best in FIGS. 3 and 5, two cameras 24 may be located in base 72—e.g., forward-facing (e.g., and in fluid communication with passage 34—not shown).

In addition, the illustrated housing 18 is merely an example. In other examples, housing 18 may comprise more or fewer inlets 30, more or fewer outlets 50 (see FIGS. 3-5), more or fewer passages 34-38, more or fewer cameras 24, more or fewer radar sensors 26, more or fewer lidar sensors 28, passages having different shapes, inlets 30 and/or outlets 50 having different shapes, different arrangements for carrying cameras 24, radar sensors 26, and/or lidar sensor(s) 28, or the like. For instance, in at least one example, the cameras 24 are not arranged in a radial fashion and in some examples, the tower 74 may not comprise annular portion 78.

Figure 8:
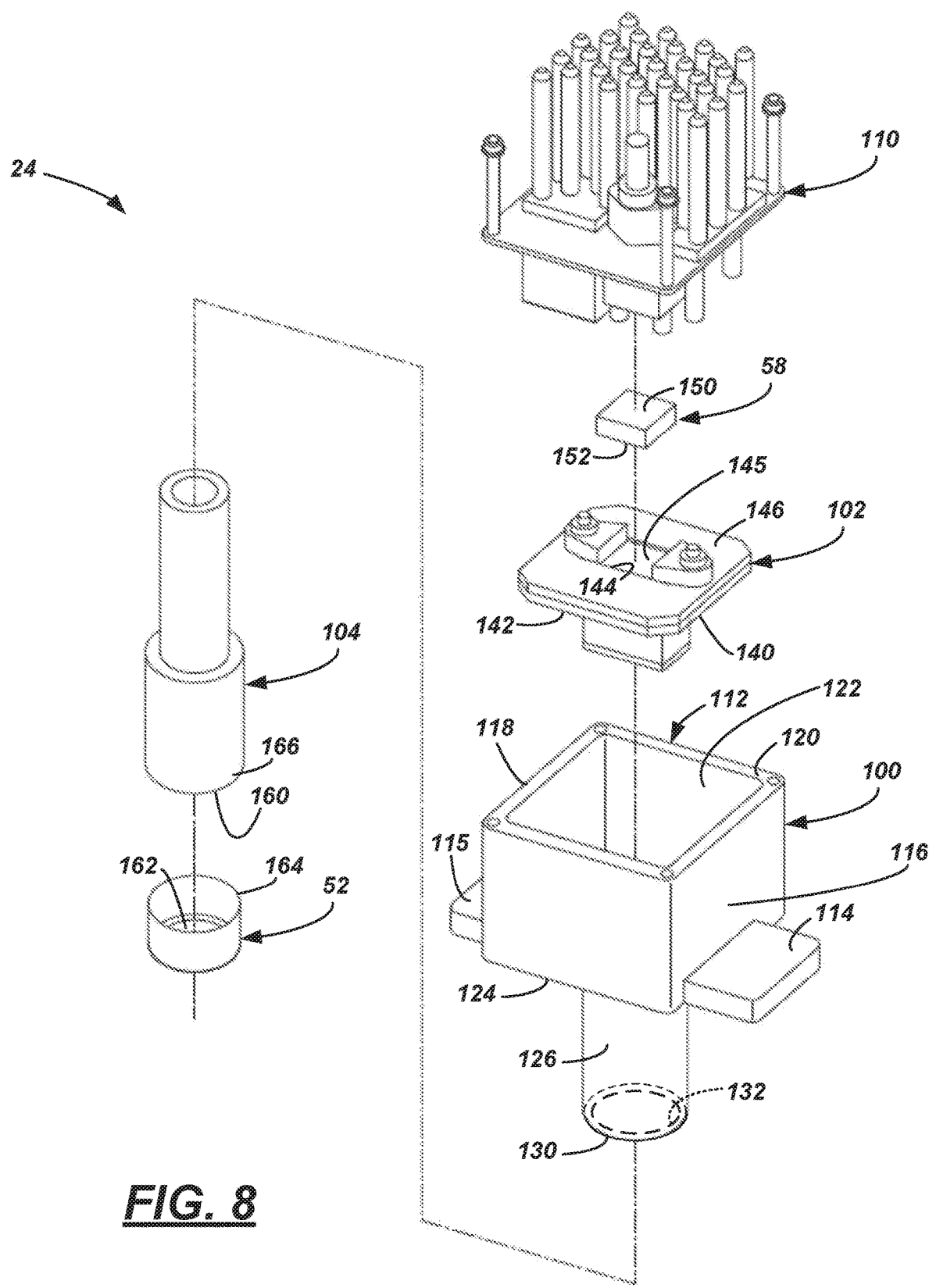
FIG. 8 is an exploded perspective view of a camera sensor, the camera sensor comprising a housing, a detector assembly, a lens cover having a positive temperature coefficient (PTC) shroud, an active cooler, and a heat exchanger.

Turning now to the cameras 24, in at least one example, each camera 24 may be identical; therefore, only one will be described in detail. Camera 24 is an electronic device that electrically communicates image data to a computer (e.g., sending computer 64 images, video, etc.). FIG. 8 illustrates an exploded view of an illustrative camera 24 that comprises a housing 100, a detector assembly 102, a lens 104, the cover 52 for lens 104, the active cooler 58, and a heat exchanger 110.

According to one example, housing 100 has a hollow body 112 that comprises a pair of mounting flanges 114, 115, each extending from a respective side 116, 118 of the body 112 (e.g., the flanges 114 adapted to mount camera 24 to the circumferential wall 87 of housing 18). A first end 120 of the body 112 may have an opening to a cavity 122 that is sized to receive the detector assembly 102. From a second end 124 of body 112, a conduit 126 axially may extend to and terminate at a distal end 130. End 130 also may comprise an opening 132 sized to receive the lens 104.

Detector assembly 102 may comprise a detector 140 (e.g., also called an electronic imager), e.g., typically an array of photosensitive pixels. Assembly 102 may comprise other elements as well—e.g., such as a printed circuit board (PCB), mounting features and hardware, a gasket, a thermal pad, and/or any other suitable component. Detector 140 may be located on one side 142 of the assembly 102, and a recess 144, comprising a major surface 145 (e.g., at the bottom of the recess 144), may be located on an opposite side 146 thereof.

Figure 9:
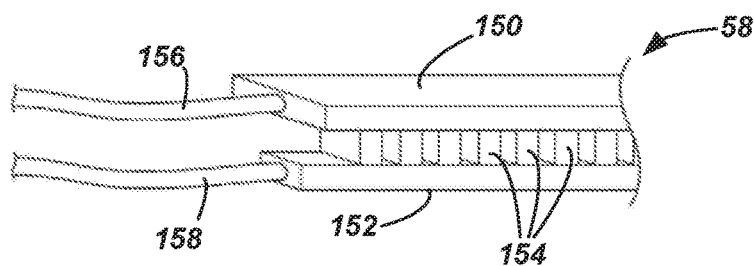
FIG. 9 is a perspective view of the TEC shown in FIG. 8.

The recess 144 may be sized to receive the active cooler 58. As used herein, an active cooler is any electronically-actuated heat transfer device. As shown in FIG. 9, active cooler 58 may comprise a hot plate 150, a cold plate 152, a plurality of conductors 154 coupling the plates 150, 152 to one another, and two connections 156, 158. One non-limiting example of active cooler 58 is a thermoelectric cooler (TEC) (also called a Peltier device, a Peltier heat pump, or a solid-state refrigerator) which utilizes the Peltier effect to create a heat flux between the hot and cold plates 150, 152. In one example, conductors 154 comprise thermoelectric materials (e.g., p-type conductors and n-type conductors). Connection 156 may be connected to the hot plate 150, and connection 158 may be connected to the cold plate 152. In operation, current flows through connection 156, through the hot plate 150, through the conductors 154, through the cold plate 152, and through connection 158. When current is flowing, heat moves from the cold plate 152 to the hot plate 150. Thus, in order to actively cool the detector 140, the cold plate 152 may be adjacent the major surface 145 (e.g., nearest detector 140).

The heat exchanger 110 may be thermally coupled to the hot plate 150 of the active cooler 58. In this manner, heat may be transferred from the cooler 58 to the heat exchanger 110, and ultimately dissipated into the air of third passage 38 (and thereafter evacuated using blower 48). The heat exchanger 110 may be a passive device—e.g., such as a heat sink having fins, blades, protrusions, etc. to dissipate heat more efficiently. Other passive and even active heat exchangers are contemplated.

Lens 104 may comprise one or more transparent elements (not shown) for magnifying, concentrating and/or dispersing light rays. Lens 104 may represent multiple lenses of any suitable configuration and any suitable materials (e.g., glass, acrylic, etc.). Lens 104 may comprise a distal surface 160—i.e., the surface upon which light entering the lens first impinges.

As used herein, a cover 52 comprises a transparent portion 162 (i.e., one of a transparent optic, a transparent film, or both). As used herein, an optic is an optical component (e.g., such as a lens, a flat or curved window, a prism, or the like). In at least one example, the cover comprises the outwardly-facing surface 56 and is adapted to protect the distal surface 160 from scratches, damage, etc. In the illustrated example, cover 52 comprises an annular band 164 coupled to and carrying the transparent portion 162 (e.g., a transparent window)—e.g., the band 164 being sized to attach cover an end 166 of the lens 104. For example, it is arranged to be located between the lens 104 of the sensor 24 and the environment outside of the housing 18. The transparent portion 162 may comprise any suitable transparent material and have a shape configured to minimize aberrations, distortion, diffusion, etc. In other examples, the transparent portion 162 may be a film applied to an optic of the sensor itself (e.g., applied directly to surface 160). And in at least one example, the cover 52 is not a separate component as shown in FIG. 8—e.g., it may be integrated with lens 104.

Figure 10:
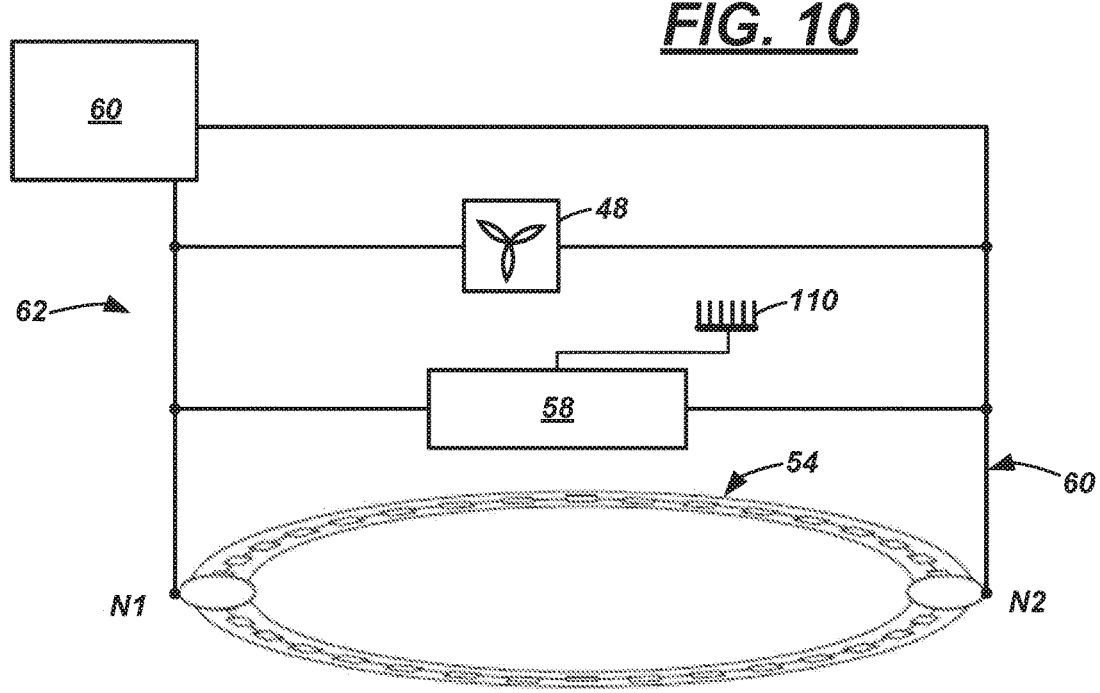
FIG. 10 is an exploded perspective view of the lens and PTC shroud and a partial schematic view of a thermal circuit.

FIG. 10 illustrates the cover 52 (e.g., annular band 164 is hidden). As discussed above, cover 52 may comprise the positive temperature coefficient (PTC) shroud 54 located on the transparent window 162. In at least some examples, the PTC shroud 54 may be adhered to, bonded, glued, or otherwise attached to surface 56. For example, as described more below, the PTC shroud 54 may be inked thereon.

According to one example (FIGS. 10-11), PTC shroud 54 comprises a substrate 180, a plurality of daisy-chained PTC elements 182, and a plurality of traces 184 that interconnects the daisy-chained PTC elements 182 in series. According to one example, the substrate 180 is a film having an adhesive on one side for bonding to surface 56 of cover 52 (of course, the substrate 180 may be applied to other suitable surfaces of the sensor as well). The substrate 180 is optional; and e.g., in at least example, it is omitted. For instance, in this latter case, the PTC elements 182 may be inked onto the outer surface 56 itself (e.g., at a manufacturing facility).

Thus, the PTC elements 182 may be printed on the substrate 180, or as described above, may be printed directed on the cover 52. In the illustrated example, the PTC elements 182 are thin rectangular sheets having an inboard side 190, an outboard side 192, a first end 194, and a second end 196. Of course, the rectangular shape is merely an example; other shapes are also possible.

Commercially-available implementations of the PTC elements 182 include variants of the Loctite™ ECI 8000 E&C Series. For example, Loctite™ ECI 8045 E&C, Loctite™ ECI 8001 E&C, Loctite™ ECI 8080 E&C, and Loctite™ ECI 8120 E&C are screen-printable inks which have resistances of 1200-1700 Ω/sq@25 µm (at a 45° C. threshold), 1500-2000 Ω/sq@25 µm (at a 65° C. threshold), 1500-2000 Ω/sq@25 µm (at a 80° C. threshold), and 1500-2000 Ω/sq@25 µm (at a 120° C. threshold), respectively.

Using one commercially-available product as an example, when PTC elements 182 comprised of Loctite™ ECI 8045 E&C reach the 45° C. threshold, the resistance may increase 6-8 times (e.g., from 242Ω to 1700Ω). The other listed variants respectively may increase 6-8 times at the thresholds 65° C., at 80° C., and 120° C.

The traces 184 may be comprised of any suitable conductive material. In at least one example, the traces 184 comprise a metal (e.g., silver, copper, or the like). Each trace 184 may extend from the first end 194 of a PTC element 182 to the second end 196 of an adjacently-located PTC element 182. Thus, PTC elements 182 and the interstitially-located traces 184, collectively, may define a circuit loop. For example, a first PTC element 182 may be coupled to a node N1 and a last PTC element 182 may be coupled to a node N2, wherein the remaining PTC elements 182 may be daisy-chained in series therebetween. Thus, when current enters node N1 it may pass through each PTC element 182 in series and then exit the PTC shroud 54 via the last node N2.

The PTC shroud 54 may be located in a periphery 198 of the cover 52 so that the majority of the cover 52 is unobstructed and the sensor's field-of-view (FOV) is minimally, if at all, diminished. According to one example, the periphery 198 is less than 5% of a surface area of outwardly-facing surface 56.

Radar sensors 26 may be any suitable electronic device that emits a radio signal, receives a reflection of that signal off an object outside the vehicle 10, and provides range data to the second computer 64—e.g., so that the computer 64 can navigate the vehicle 10. While not shown, radar sensors 26 may comprise active and/or passive coolers which ultimately radiate heat into one or more of the passages 34-38. Further, in some examples, one or more of the radar sensors 26 may comprise a PTC shroud.

Lidar sensors 28 may be any suitable electronic device that emits visible or non-visible light signals, receives a reflection of the light signal off an object outside the vehicle 10, and provides range data to the second computer 64. This data also may enable the computer to navigate the vehicle 10 and/or be used for other purposes Like the radar sensors 26, sensor(s) 28 may comprise active and/or passive coolers which ultimately radiate heat into one or more of the passages 34-38 (e.g., such as passage 36, as shown in FIG. 5). Further, in some examples, one or more of the lidar sensors 28 may comprise a PTC shroud.

Turning now to blower 48, as used herein, a blower is any mechanical device adapted to move air. Non-limiting examples of blower 48 include an axial-flow fan, a centrifugal fan, a cross-flow fan, a positive displacement pump, a reciprocating pump, or the like. In at least one example, the blower 48 is powered by electricity—e.g., so that first computer 60 may actuate it between an ON state and an OFF state.

Turning now to first computer 60 and second computer 64 (FIGS. 2, 12), these computers are hardware devices which comprise one or more processors and any suitable computer memory. Non-limiting examples of processors include microprocessors, microcontrollers or controllers, application specific integrated circuits (ASICs), and field-programmable gate arrays (FPGAs), just to name a few. Non-limiting examples of memory include conventional hard disks, solid-state memory, random-access memory (RAM), read-only memory (ROM), erasable programmable read-only memory (EPROM), and electrically erasable programmable read-only memory (EEPROM), just to name a few. The processor(s) may be programmed to process and/or execute digital instructions stored in memory. These instructions may be embodied as any suitable type of computer code, software programming, firmware programming, or the like.

According to one non-limiting example, the first computer 60 is a cleaning control module (CCM) or a body control module (BCM) (having a processor 200 and memory 210) and the second computer 64 is an autonomous driving computer (ADC) (having a processor 220 and memory 230). These are merely examples; and other examples exist.

Among other things, the ADC 64 may be responsible for powering and/or operating of the imaging system 12—e.g., controlling whether the cameras 24, the radar sensors 26, and/or lidar sensor(s) 28 are in an ON state or OFF state, and also controlling the thermal circuit 62 which may comprise—e.g., when the sensors are in an ON state—selectively controlling actuation of the blower 48, the active coolers 58, and/or the PTC shrouds 54. While not required, in at least one example, the CCM 60 independently can control the blower 48 and any of the cameras 24. Selective control may be facilitated using a multiplexor 240 or any other suitable selection circuit or control algorithm. Further, while not required, in at least one example, the CCM 60 can actuate the blower 48 from an OFF state to an ON state, and without additional control signals or instructions, actuate the active cooler(s) 58 and corresponding PTC shroud(s) 54 from the OFF state to an ON state. For example, as illustrated conceptually in FIG. 10, CCM 60 may control power to the blower 48 and consequently control power to each active cooler 58 (e.g., coupled in parallel). Internal to each camera 24, the corresponding PTC shroud 54 may be coupled in parallel with the active cooler 58 so that when the cooler 58 is actuated to an ON state, current is delivered to the PTC shroud 54 (and conversely, when the cooler 58 is actuated to an OFF state, power is terminated to the corresponding PTC shroud 54).

The processor(s) 220 of ADC 64 may control steering, acceleration, and braking of vehicle 10. Such autonomous operation may comprise processor(s) 220 receiving sensory data from the sensor suite 22 of the imaging system 12. According to one example, the ADC 64 may be programmed to: identify instances when captured image and/or range data is degraded (e.g., due to decreased transmittance); identify that the cause of the decreased transmittance is debris at the cover 52; and based on the identification(s), command the actuation of the blower 48, the active cooler(s) 58, and/or the PTC shroud(s) 54. The term 'degraded' includes any one or combination of the following: obscured, distorted, and obstructed. Transmittance refers to an amount of undiffused light that passes through the cover 52 and lens 104. In at least one example, ADC 64 is programmed to command the CCM 60—e.g., via a network connection 250 to actuate one or more of the blower 48, the active coolers 58, and/or the PTC shrouds 54.

Network connection 250 may include one or more of a controller area network (CAN) bus, Ethernet, Local Interconnect Network (LIN), a fiber optic connection, or the like—just to name a few non-limiting examples. According to one example, which may be used alternatively or in combination with a bus example, connection 250 comprises one or more discrete wired or wireless connections. For example, CCM 60 and ADC 64 may communicate via a CAN bus, sensors 24-28 may communicate image and/or range data to ADC 64 via discrete connections, and CCM 60 controls sensors 24-28 via LIN.

Figure 12:
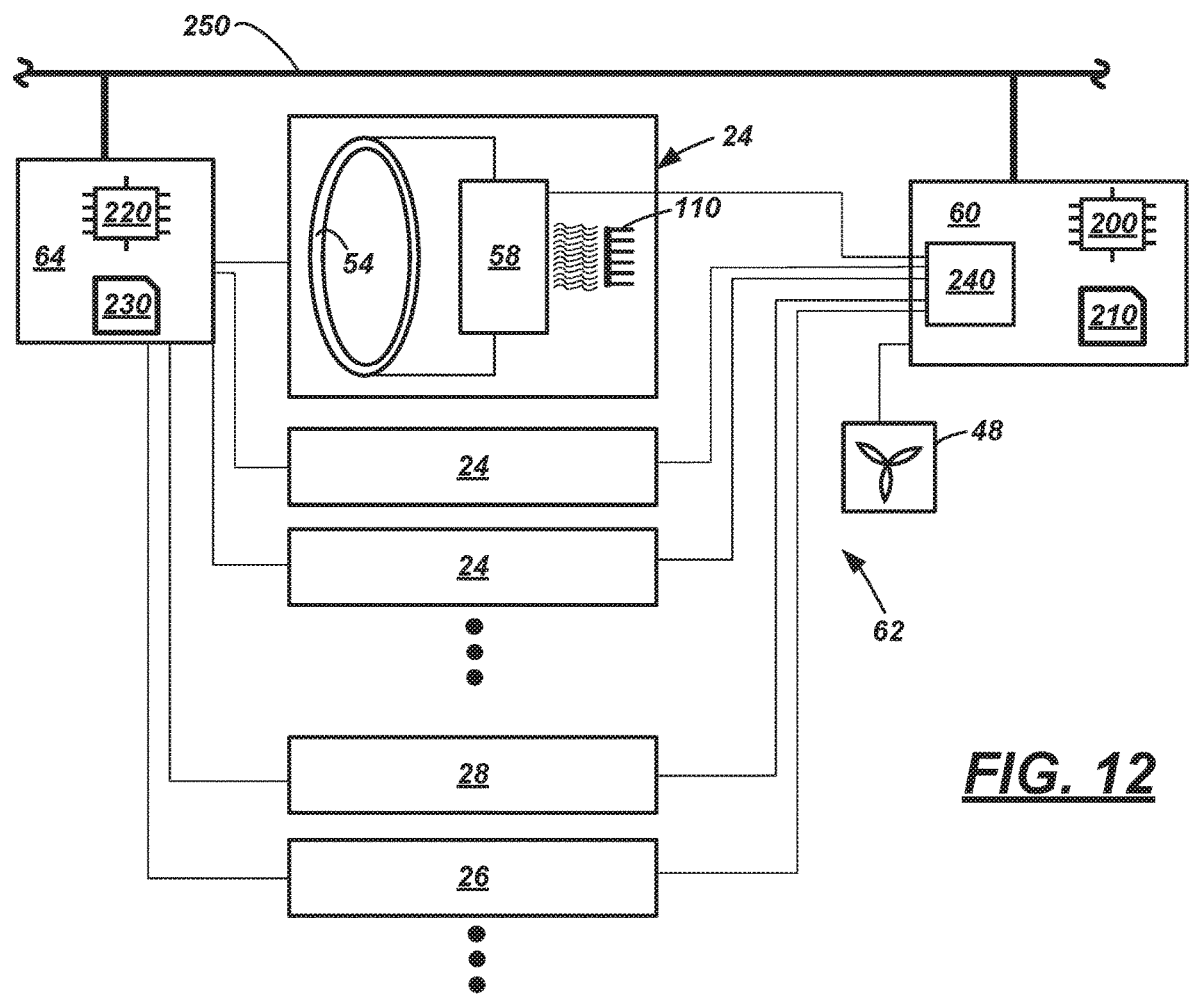
FIG. 12 is a schematic view of one example of a thermal circuit.

It should be appreciated that the thermal circuit 62 shown in FIG. 10 and the thermal circuit 62 shown in FIG. 12 are schematic in nature. Each of the schematic illustrations are merely examples which illustrate functionality of the thermal circuit 62 and which may be implemented exclusive of one another or which may be combined with one another in any suitable fashion.

In operation, ADC 64 may receive image and/or range data (e.g., also referred to as sensor data) from the sensors 24-28. While this image and/or range data is received, the CCM 60 may control operation of the thermal circuit 62. In one example, the ADC 64 may determine that a degradation in image data is attributable to debris on the respective covers 52 of one or more sensors 24, and based on this determination, ADC 64 may instruct the CCM 60 (via network connection 250) to operate the thermal circuit 62. In another example, the CCM 60 independently may determine to actuate thermal circuit 62—e.g., based on temperature data within housing 18 or the like (e.g., collected from temperature sensors or the like (not shown)). In either instance, CCM 60 may actuate the blower 48 from an OFF state to an ON state. In at least one example, when the CCM 60 actuates the blower 48 to the ON state, the active coolers 58 of the thermal circuit 62 also are actuated. When the coolers 58 are actuated, they may move heat away from the respective detectors 140—e.g., from the cold plate 152 to the hot plate 150 (e.g., via the conductors 154). Thereafter, the thermal coupling of the hot plate 150 and the heat exchanger 110 may deliver heat into one of the passages 34-38 and the blower 48 may exhaust the heated air from the housing 18. As described above, this heated air may be directed across the covers 52 of the respective sensors 24, 26, and/or 28.

In at least one example, when the active coolers 58 are actuated to the ON state, current also may flow through the corresponding PTC shrouds 54. With respect to any individual PTC shroud 54, when the temperature at the PTC shroud 54 is less than a predetermined threshold, resistivity of the PTC elements 182 may be relatively low and—at a predetermined vehicle voltage (e.g., 12 Volts)—the current through the PTC elements 182 may be relatively high causing the PTC elements 182 to radiate a relatively larger amount of heat. According to one example, the thermal properties of the PTC elements 182 may facilitate heating of the PTC shroud 54 to 90° C. in as little as 10 seconds. Conversely, with respect to any individual PTC shroud 54, when the temperature at the PTC shroud 54 is greater than a predetermined threshold, resistivity of the PTC elements 182 may be relatively high and—at a predetermined vehicle voltage (e.g., 12 Volts)—the current through the PTC elements 182 may be relatively low causing the PTC elements 182 to radiate a relatively smaller (perhaps negligible) amount of heat.

Accordingly, when the environment of vehicle 10 is below freezing, the thermal circuit 62 may facilitate melting of snow or ice on the covers 52—e.g., based on the heating of the PTC shroud 54 and/or the warm air being exhausted from the outlets 50—resulting in improved sensor data quality as the covers 52 are cleared of ice, snow, sleet, and moisture that resulted from the PTC shroud heat (or warm air) melting ice or snow thereon. Similarly, when the environment of vehicle 10 is relatively hot, the thermal circuit 62 may facilitate clearing of any debris from the covers 52 while concurrently not causing additional heat from the PTC shroud 54 to heat the respective sensor 24. For example, the active coolers 58 may move heat away from the respective detectors 140 and the blower 48 may force air across the respective covers 52 to clear debris, but the covers 52 are not heated due to the temperature-sensitive properties of the PTC elements 182. Similarly, this may result in improved image data quality as the covers 52 are cleared of debris.

Other examples of the illustrative imaging system 12 exist as well. For example, the blower 48 and one or more of the active coolers 58 need not be electrically coupled in parallel (as shown in FIG. 10). In at least one example, CCM 60 may control the blower 48 independently of the sensors 24, e.g., as shown in FIG. 12.

In at least one example, the functionality and programming of the CCM 60 and ADC 64 are integrated into a single computing device.

According to at least one example, the cover 52 comprises the distal surface 160—e.g., surface 160 may be resistant to scratches and other damage. Thus, in at least one example, the PTC shroud 54 may be located on the distal surface 160 instead.

In another example, outwardly-facing surface 56 (of cover 52) or distal surface 160 further comprises a hydrophobic film 300 adhered thereto. And the temperature control characteristics of the PTC shroud 54 avoid heating the cover 52 (or lens 104) when otherwise doing so would damage (e.g., burn, melt, etc.) the hydrophobic film 300.

Figure 13:
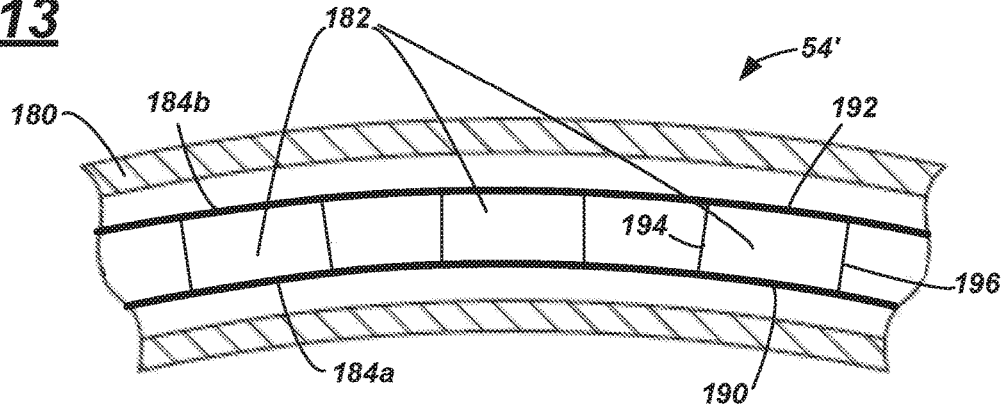
FIG. 13 is a top view of a portion of another example of a PTC shroud.

Other implementations of the PTC shroud also exist. For example, FIG. 13 illustrates a PTC shroud 54' that comprises a pair of parallel traces: an inboard trace 184a and an outboard trace 184b (e.g., trace 184b being concentric with trace 184a). In this implementation, node N1 may be coupled electrically to inboard trace 184a and node N2 may be coupled electrically to outboard trace 184b—e.g., so that current flows from the across the PTC element 182 (from inboard side 190 to outboard side 192, or vice-versa), instead of first end 194 to second end 196 (or vice-versa). By using two parallel traces 184a, 184b, a failure of any one of the PTC elements 182 does not result in a total failure of the PTC shroud 54'.

Thus, there has been described an imaging system that comprises at least one sensor having a cover and a positive temperature coefficient (PTC) shroud on the cover. The PTC shroud may warm the cover consistent with the thermal properties of the PTC material.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A sensor, comprising:
a cover;
a positive temperature coefficient (PTC) shroud located at a periphery of the cover; and
an active cooler electrically coupled to the PTC shroud.

2. The sensor of claim 1, wherein the cover is a transparent window, a transparent optic, or a transparent film.

3. The sensor of claim 1, wherein the cover is located in front of a lens of the sensor.

4. The sensor of claim 1, wherein the PTC shroud comprises a plurality of daisy-chained PTC elements.

5. The sensor of claim 1, wherein the PTC shroud comprises a plurality of PTC elements coupled in parallel.

6. The sensor of claim 1, wherein the active cooler is a thermoelectric cooler.

7. The sensor of claim 1, wherein the active cooler and PTC shroud are electrically coupled so that when the active cooler is actuated to an ON state, current is provided to the PTC shroud.

8. A system, comprising: a housing that carries the sensor of claim 1 in a passage thereof; and a blower, wherein, when the blower is in an ON state, the active cooler is actuated to the ON state and air heated by the sensor is moved out of the housing.

9. A system, comprising: a housing that carries the sensor of claim 1 in a passage thereof; and a blower, wherein, when the blower is in an ON state, air heated by the sensor is moved out of the housing.

10. The system of claim 9, wherein the housing is mounted to a roof of a vehicle.

11. The system of claim 9, wherein the sensor further comprises a heat exchanger, wherein the housing comprises an inlet, an outlet, and at least one passage in fluid communication with one another, wherein the heat exchanger is located in the at least one passage.

12. The system of claim 9, further comprising a first computer that controls: the blower between an OFF state and the ON state, and whether current flows through the PTC shroud; and a second computer that receives image data, range data, or both from the sensor.

13. The system of claim 12, wherein the first and second computers are a single computing device.

14. The system of claim 12, wherein, based on a degradation of image data received from the sensor, the second computer instructs the first computer to actuate the blower to the ON state.

15. The system of claim 9, wherein the passage is an annular passage, and further comprising a plurality of sensors as described in claim 1, wherein the plurality is circumferentially-spaced from one another in the annular passage, each sensor positioned radially outwardly.

16. A system, comprising:
a housing, comprising an interior passage; and
a plurality of sensors in the interior passage, each sensor, comprising:
a cover;
a positive temperature coefficient (PTC) shroud located at a periphery of the cover; and
an active cooler electrically coupled to the PTC shroud.

17. The system of claim 16, wherein the active cooler electrically is coupled to the PTC shroud so that when the active cooler is actuated to an ON state, current is provided to the PTC shroud.

18. The system of claim 17, further comprising a blower that moves air through the interior passage and that is electrically coupled to the active cooler so that, when the blower is actuated to an ON state, the active cooler also is actuated to the ON state.

19. The system of claim 16, further comprising a blower that moves air through the interior passage, wherein the housing comprises an outlet located proximate to each respective cover so that when the blower moves air, it is expelled from the housing via the outlets.

* * * * *